(12) United States Patent
Denton et al.

(10) Patent No.: US 7,738,984 B2
(45) Date of Patent: Jun. 15, 2010

(54) SYSTEM FOR AND METHOD OF INTERPOLATION FOR SUPPLY CHAIN PLANNING

(75) Inventors: Brian T. Denton, Rochester, MN (US); Thomas R. Ervolina, Poughquag, NY (US); Robert J. Milne, Jericho, VT (US); Robert A. Orzell, Essex Junction, VT (US); Samik Raychaudhuri, Denver, CO (US)

(73) Assignee: International Business Machines Corporation, Armonk, NY (US)

(*) Notice: Subject to any disclaimer, the term of this patent is extended or adjusted under 35 U.S.C. 154(b) by 662 days.

(21) Appl. No.: 11/530,999

(22) Filed: Sep. 12, 2006

(65) Prior Publication Data

US 2008/0071603 A1    Mar. 20, 2008

(51) Int. Cl.
G06F 19/00 (2006.01)
(52) U.S. Cl. .................. 700/102; 700/97; 700/103; 705/8
(58) Field of Classification Search ............... 700/36, 700/97, 99, 100, 106; 705/8, 29
See application file for complete search history.

(56) References Cited

U.S. PATENT DOCUMENTS

| | | | |
|---|---|---|---|
| 5,943,484 A | | 8/1999 | Milne et al. |
| 5,971,585 A * | | 10/1999 | Dangat et al. ............ 700/102 |
| 5,974,395 A | | 10/1999 | Bellini et al. |
| 6,157,915 A * | | 12/2000 | Bhaskaran et al. ........... 705/7 |
| 6,332,155 B1 | | 12/2001 | Notani |
| 6,701,201 B2 * | | 3/2004 | Hegde et al. ............. 700/107 |
| 6,738,682 B1 * | | 5/2004 | Pasadyn .................. 700/100 |
| 7,103,436 B2 * | | 9/2006 | Denton et al. ............ 700/102 |
| 7,289,859 B2 * | | 10/2007 | Miwa et al. ............... 700/97 |
| 7,337,031 B1 * | | 2/2008 | Birjandi et al. ............ 700/99 |
| 2005/0288892 A1* | | 12/2005 | Martini .................... 702/179 |

* cited by examiner

Primary Examiner—Ramesh B Patel
Assistant Examiner—Douglas S Lee
(74) Attorney, Agent, or Firm—Ryan K. Simmons (57) ABSTRACT

A method of iterative negotiation for improved production planning between one or more purchasers and suppliers in a supply chain. The method includes a purchaser in a supply chain generating a request schedule that is communicated to a supplier. In response to the request schedule the supplier generates a commit schedule and communicates it back to the purchaser. Through the iterative negotiation process (ask-answer) one or more interpolation constraints are generated based on the supplier's commit schedules. Upon completion of the ask-answer process purchaser solves a final advanced planning system (APS) based on said one or more interpolation constraints and generates a final production plan. The invention can be employed to integrate the collaboration among purchasers and suppliers with an advanced planning system for optimizing established planning objectives (e.g. customer service, short lead times, low inventory, and prioritized allocation of supply and capacity).

27 Claims, 8 Drawing Sheets

SYSTEM FOR AND METHOD OF INTERPOLATION FOR SUPPLY CHAIN PLANNING

FIELD OF THE INVENTION

The present invention relates to a system and method of improved supply chain planning. More particularly, the present invention relates to computer implementable decision support systems for determining a supply chain plan suitable to multiple collaborating firms.

BACKGROUND OF THE INVENTION

A fundamental problem faced in manufacturing industries is the allocation of material and capacity assets to meet end customer demand. Production lead times necessitate the advance planning of production starts, interplant shipments, and material substitutions throughout the supply chain so that these decisions are coordinated with the end customers' demand for any of a wide range of finished products (typically on the order of thousands in semiconductor manufacturing). Such advance planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming (LP).

BRIEF SUMMARY OF THE INVENTION

In view of the foregoing and other problems and drawbacks of conventional systems and methods of supply chain planning, it is therefore an aspect of the present invention to provide a method and system including the use of supplier information to determine a production plan for the purpose of improving supply chain planning, the method including the steps of: (a) generating at least one request schedule by at least one first entity, (b) generating at least one commit schedule by at least one second entity in response to the at least one request schedule, (c) generating one or more interpolation constraints based on a response from the at least one second entity, (d) solving a planning system of the at least one first entity based on the one or more interpolation constraints, and (e) repeating steps (a)-(d) until a condition of the planning system is satisfied. In the method, one of the at least one request schedule may be an initial request schedule. Further, the initial request schedule may be based on a solution of the planning system of the at least one first entity, where one or more parts of the at least one second entity may be assumed to be unconstrained. A condition of the planning system may be satisfied when the at least one request schedule is satisfied, and upon satisfaction the production plan is executed based on the at least one satisfied request schedule. Alternatively, the condition of the planning system may be satisfied when the at least one request schedule is not satisfied, and then the final planning system of the at least one first entity is solved, based on the last commit schedule from the supplier, before executing the production plan. The at least one first entity and second entity may include a purchaser and a supplier respectively. The at least one request schedule and/or commit schedule may be generated using a warm start. The one or more interpolation constraints may be based on the at least one commit schedule of the at least one second entity. The at least one request schedule and/or the at least one commit schedule may be generated using a linear programming (LP) model. The at least one request schedule may be based on the at least one commit schedule. The at least one commit schedule may be based on the at least one request schedule.

In another aspect, the invention provides a program storage device readable by machine, tangibly embodying a program of instructions executable by the machine to perform a method of determining a production plan including the steps of: (a) generating at least one request schedule by at least one first entity, (b) generating at least one commit schedule by at least one second entity in response to the at least one request schedule, (c) generating one or more interpolation constraints based on a response from the at least one second entity, (d) solving a planning system of the at least one first entity based on the one or more interpolation constraints, and (e) repeating steps (a)-(d) until a condition of the planning system is satisfied.

In yet another aspect the invention provides a computer system, including: a processor, an address/data bus coupled to the processor; and a computer-readable memory unit adapted to be coupled to the processor, the memory unit containing instructions that when executed by the processor implement a method of determining a production plan including the steps of: (a) generating at least one request schedule by at least one first entity, (b) generating at least one commit schedule by at least one second entity in response to the at least one request schedule, (c) generating one or more interpolation constraints based on a response from the at least one second entity, (d) solving a planning system of the at least one first entity based on the one or more interpolation constraints, and (e) repeating steps (a)-(d) until a condition of the planning system is satisfied.

The method of the present invention is based on the use of supplier information to augment new constraints to determine if alternative materials can be requested from the supplier resulting from potential material substitutions or utilization of alternate manufacturing processes. For example, if a purchaser wants to make 100 pieces of part X which can be made by assembling either supplier provided part Y or part Z; the purchaser can successively ask for various combinations of Y and Z; based on the supplier responses, the purchaser can interpolate availability to decide on how many of Y and Z to order. As another example, if a purchaser has demands for 100 of part A (which is made by assembling part C) and 100 of part B (which is made by assembling part D) and further that the purchaser has capacity to produce only 150 total pieces of any combination of A and B; by passing various combinations of demands for C and D on the supplier and interpolating the supplier responses, the purchaser is able to decide how much of A and B to produce and how much of C and D to order.

The invention comprises a method for enabling interpolation of supplier commitments from multiple requests in order to build a continuous set of feasible solutions based on a discrete set of solutions provided by the supplier via an iterative "ask-answer" process. The ask-answer process enables supply negotiation between a purchaser and supplier in an extended supply-chain until a satisfactory solution is found for both parties. This process naturally leads to a sampling of commit schedules which can be used as input for the interpolation process. At each iteration of the ask-answer process each enterprise resolves an existing production planning model, for example a linear programming (LP) model, based on incremental changes, to generate either a revised request schedule (provided by the purchaser) or a revised commit schedule (provided by the supplier). Updating the schedule corresponds to a modification in the right hand side of a linear constraint in the model, and hence can be achieved by updating the existing solution using a fast method commonly known and used in the art today, such as the dual simplex method.

By interpolating across the set of supplier commitments (e.g. commit schedules), the purchaser obtains knowledge of the supplier's capability. The purchaser is thus able to exploit that knowledge and thus implicitly optimize the purchaser's operations accordingly. As a result, the time required to complete the ask-answer process will be reduced. Since the time available for such processes is limited, in practice, the invention will lead to better quality solutions for both the purchaser and supplier.

Furthermore, in addition to providing the purchaser with the ability to interpolate supplier capabilities, the invention facilitates the purchaser providing the supplier with kitting information. The supplier may thus optimize its operations so as to make commitments to deliver complete kits of parts. A "kit" is a set of parts which the purchaser will always use together, such as in an assembly operation, which needs a full kit in order to create the assembled product. As with the interpolation, this kitting information speeds up the ask-answer process. Consequently, the invention improves the results of multi-enterprise supply chain planning with only a minimal exchange of additional information between the parties.

DETAILED DESCRIPTION

A production planning linear program (LP) (such as that described in U.S. Pat. No. 5,971,585, "Best Can Do Matching of Assets with Demand in Microelectronics Manufacturing," issued Oct. 26, 1999) can determine decisions including: production starts, material substitutions, and shipments planned to customers, between manufacturing and distribution locations, and from vendor suppliers. An LP is composed of an objective function that defines a measure of the quality of a given solution, and a set of linear constraints. The types of equations used in production planning models are well known to those practiced in the art and include:

(1) Material Balance Constraints which describe the allowable flow of materials through the network of stocking points comprising the supply chain.
(2) Capacity Constraints which define the amount of capacity available for manufacturing activities.
(3) Inventory Constraints which define the amount of inventory of a given part or group of parts that can be carried at a particular stocking point.
(4) Backorder Conservation Constraints which balance the quantity of a given part backordered in a given planning period with the quantity backordered in the previous planning period and the net of new demand and new shipments.

The entire LP formulation is provided below in the form familiar to those practiced in the art; i.e., definition of subscripts, definition of objective function coefficients, definition of constants, definition of decision variables, LP formulation or equations.

Definition of Subscripts j—time period
m—material (part number)
a—plant location within the enterprise
n—material being substituted
z—group (which represents a family or collection of part numbers)
e—process (a method of purchasing or manufacturing a material at a plant)
v—receiving plant location
k—demand center (i.e., customer location) (Note: the set of customer locations is mutually exclusive from the set of plant locations)
q—demand class which indicates relative priority Definition of Objective Function Coefficients $PRC_{jmae}$—cost of releasing one piece of part m during period j at plant a using process e
$SUBC_{jmna}$—substitution cost per piece of part number n which is being substituted by part number m during period j at plant a
$TC_{jmav}$—transportation cost per piece of part number m leaving plant a during period j which are destined for plant v
$INVC_{jma}$—inventory cost of holding one piece of part number m at the end of period j at a particular plant a
$SUB2C_{jmak}$—substitution cost per piece of part number n which is being substituted by part number m during period j for shipments from plant a to satisfy demand at customer location k
$BOC_{jmkq}$—backorder cost of one piece of part m at the end of period j for class q demand at customer location k Definition of Constants $DEMAND_{jmkq}$—demand requested during time period j for part number m at customer location k for demand class q
$RECEIPT_{jma}$—quantity of projected wip and purchase order receipts for part number m expected to be received at plant a during time period j
$CAPACITY_{jaw}$—Capacity of resource w available at plant a during period j to support production starts
$CAPREQ_{jmaew}$—Capacity of resource w required for part number m at plant a for process e during period j
$QTYPER_{jmaen}$—quantity of component m needed per part number n during period j at plant a using process e
$YIELD_{jmae}$—output of part number m per piece released or started at plant a during time period j using process e
$SUBQTY_{jmna}$—quantity of part number m required to substitute for one piece of part number n at plant a during time period j $CT_{jmae}$—Cycle time. The number of periods between the release and completion of part m jobs for releases made using process e at plant a during time period j $TT_{mav}$—transport time for part number m from plant a to plant v Definition of LP Decision Variables $I_{jma}$—Inventory at the end of period j for part number m at a particular plant a $P_{jmae}$—Production starts of part m during period j at plant a using process e $L_{jmna}$—Quantity of part number n which is being substituted by part number m during period j at plant a $T_{jmav}$—Internal shipments of part number m leaving plant a during period j which are destined for plant v $F_{jmakq}$—Shipments of part number m leaving plant a during period j and satisfying class q demand at external customer k $B_{jmkq}$—Back orders of part m at the end of period j for class q demand at customer location k LP Equations or Formulation Objective Function:

Minimize:

$$\sum_j \sum_m \sum_a \sum_e PRC_{jmae} P_{jmae} +$$
$$\sum_j \sum_m \sum_n \sum_a SUBC_{jmna} L_{jmna} + \sum_j \sum_m \sum_a \sum_v TC_{jmav} T_{jmav} +$$
$$\sum_j \sum_m \sum_a INVC_{jma} I_{jma} + \sum_j \sum_m \sum_k \sum_q BOC_{jmkq} B_{jmkq}$$

Subject to:

Capacity Constraints $$\sum_m \sum_e CAPREQ_{jmaew} P_{jmae} \leq CAPACITY_{jaw}$$

Backorder Constraints:

$$B_{jmkq} = B_{(j-1)mkq} + DEMAND_{jmkq} - \sum_a F_{jmakq}$$

Material Balance Constraints:

$$I_{jma} = I_{(j-1)ma} + RECEIPT_{jma} + \sum_{\substack{x\ s.t \\ x+CTxmae=j}} \sum_e YIELD_{xmae} * P_{xmae} +$$

$$\sum_n L_{jmna} + \sum_{\substack{x\ s.t \\ x+TTmav=j}} \sum_v T_{xmva} - \sum_n SUBQTY_{jmna} * L_{jmna} -$$

$$\sum_v T_{jmav} - \sum_k \sum_q F_{jmakq} - \sum_{\substack{n\ s.t.m \\ \text{is a component} \\ \text{of } n}} \sum_e QTYPER_{jmaen} P_{jnae}$$

Non-Negativity Constraints all $X_{i,j\ldots} \geq 0$, where X is a generic decision variable and i, j etc. represent generic subscripts Advanced planning systems (APS) based on models such as that described above are used in most high tech manufacturing industries to determine optimal resource allocation to supply customer demand requests. In one example, the system is used in planning production starts, interplant shipments, customer shipments, substitutions, and inventory in the semiconductor and data storage industries. The example system is based on a mathematical programming model, such as in the example above, with an objective function and a series of linear constraints determining feasible solutions. The goal in using such a system is to determine the optimal supply chain plan based on a variety of competing criteria (e.g. inventory holding costs, backorder costs, processing costs, etc.).

Figure 1:
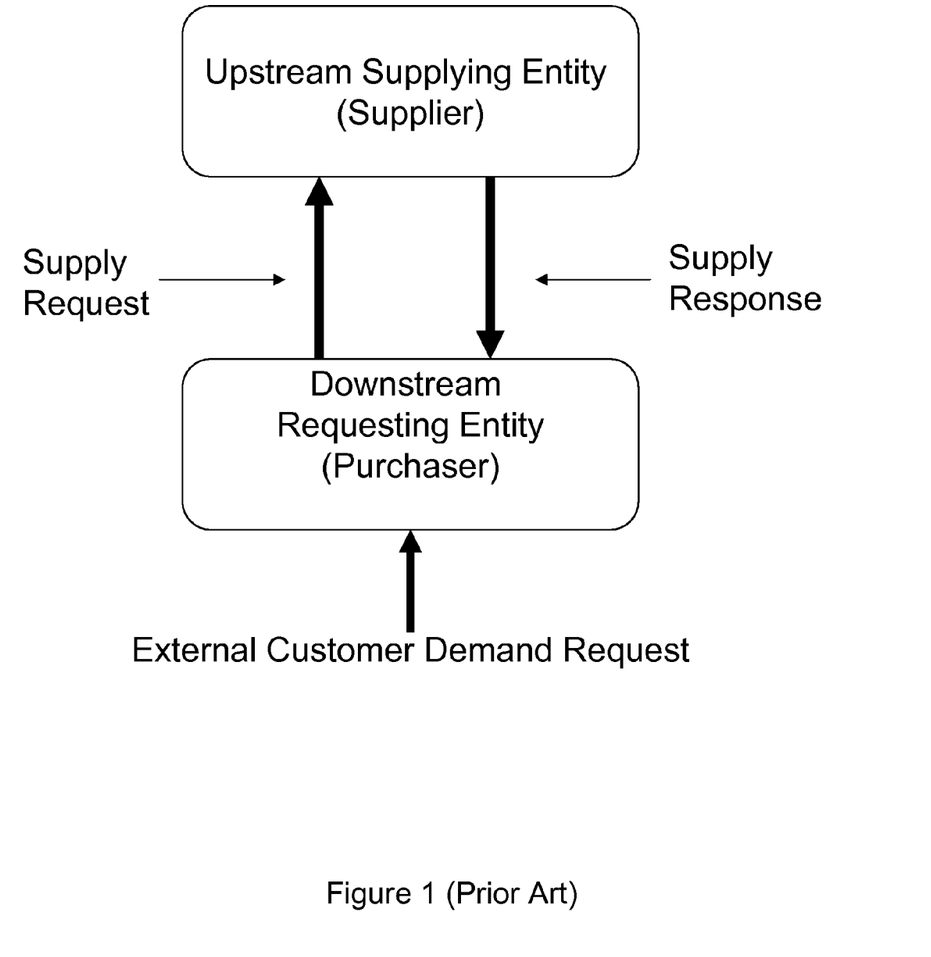
FIG. 1 shows communication between supplier and purchaser in a conventional supply chain.

Typically, external customers provide a schedule of projected supply requirements for a set of part numbers for various "request dates." These are then added to the APS model and run to determine feasible "commit dates," which may be later than the request dates in some cases due to supply and/or resource shortages. These two schedules are referred to as "request schedule" and "commit schedule" respectively. In most industries the exchange of request and commit schedules is a periodic event (e.g. weekly, monthly), and is often referred to as an "ask-answer" process. A process well known in the art is summarized in FIG. 1 where the downstream first entity (e.g., purchaser) reacts to external customer demand requests by placing a supply request on the upstream second entity (e.g., supplier). The supplier generates a supply response which it provides to the purchaser.

Figure 2:
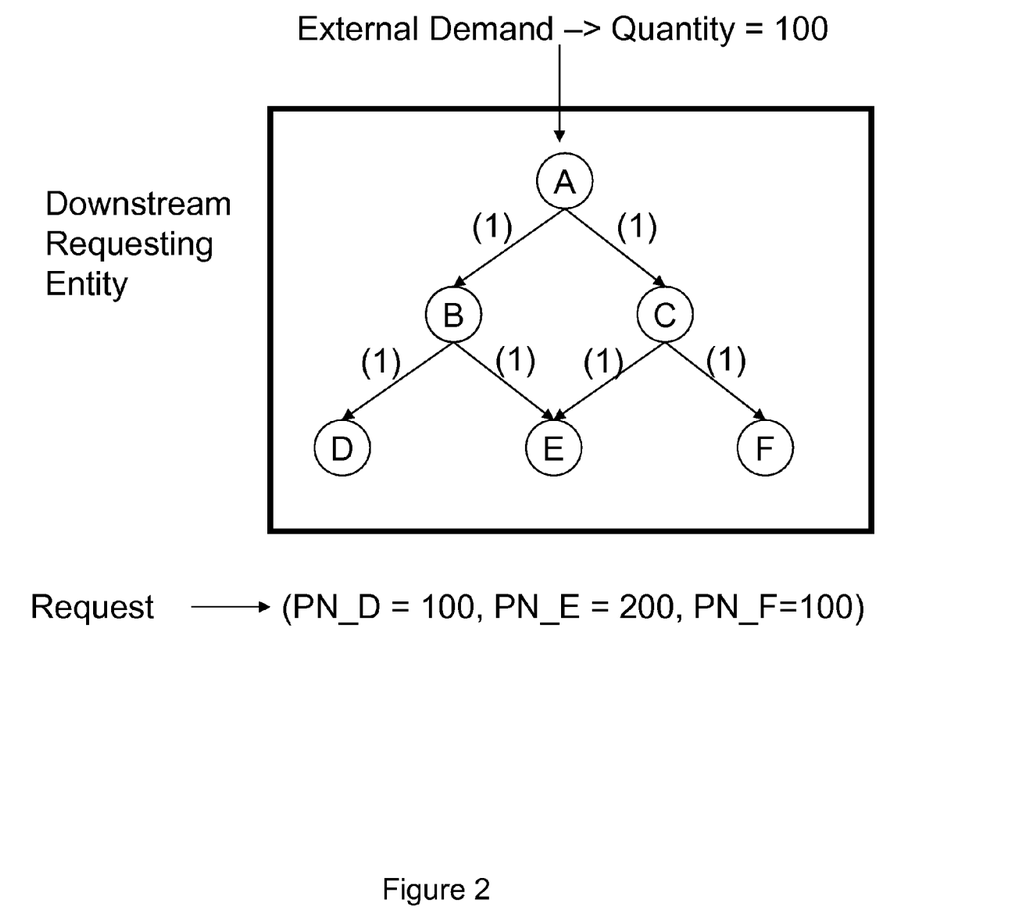
FIG. 2 shows a purchaser's supply request generation for multi-level bill-of-material.

FIG. 2 illustrates a first entity (e.g., purchaser) supply request generation for a multi-level bill-of-materials. In this example, the purchaser receives an external demand for a quantity of 100 pieces of part number A and explodes it through its bills of materials supply chain to create demands of 100, 200, and 100 pieces for parts D, E, and F which are then passed as a request to the second entity (e.g., supplier).

Although we describe the invention in terms of a purchaser buying parts from a supplier, those skilled in the art will recognize that the invention may also be applied in circumstances, such as when the supplier is providing foundry services for the downstream enterprise or where the upstream and downstream enterprises are members of a same parent corporation or joint venture. In such cases the upstream enterprise is considered the supplier and the downstream enterprise is considered the purchaser. Similarly, although the method is described as being applicable when a linear programming algorithm is used as the APS of both the downstream and upstream enterprises, those skilled in the art will recognize that the invention may also be applied where other APS methods (e.g. heuristic optimization methods) are used. Further, although the method is been described with reference to a single purchaser and single supplier, those skilled in the art will recognize that the invention may include multiple purchasers and/or suppliers.

An improvement above the prior art that is proposed in this disclosure is to provide for iterative communication to allow successive improvements to the commit schedule from both the purchaser and supplier perspective. Further, a fundamentally new concept practiced in this invention is the use of a method for interpolating between multiple commit schedules by exploiting properties of the constraint set typical of APS mathematical programming models. This interpolation method involves the construction, on behalf of the purchaser, of a set of feasible solutions that are known to be feasible in addition to the discrete set of points provided by the supplier.

The main idea of the invention is the accumulation of discrete feasible points based on the iterative ask-answer process described below. Assuming that the supplier's APS model corresponds to a convex set of constraints one can employ the well known mathematical property that a convex combination of points in a convex set is also a member of the set. So, for instance, assuming the supplier has provided commit schedules $F_1$ and $F_2$ the purchaser may infer that:

$$a F_1 + (1-a) F_2$$

defines a continuous set of feasible solutions in the range $0 <= a <= 1$. Or more generally for N commit schedules $F_1, F_2, \ldots, F_N$ that $$a_1 F_1 + a_2 F_2 + \ldots + a_n F_n$$

where $$\sum_{i=1}^{N} a_i = 1$$

and $a_i >= 0$ for $i=1 \ldots N$. This defines an N-dimensional continuous space of feasible solutions.

By exploiting the above property, a purchaser may develop a new set of linear constraints that can be augmented to its existing APS model and which define the supplier's "implied" supply constraints.

Figure 3:
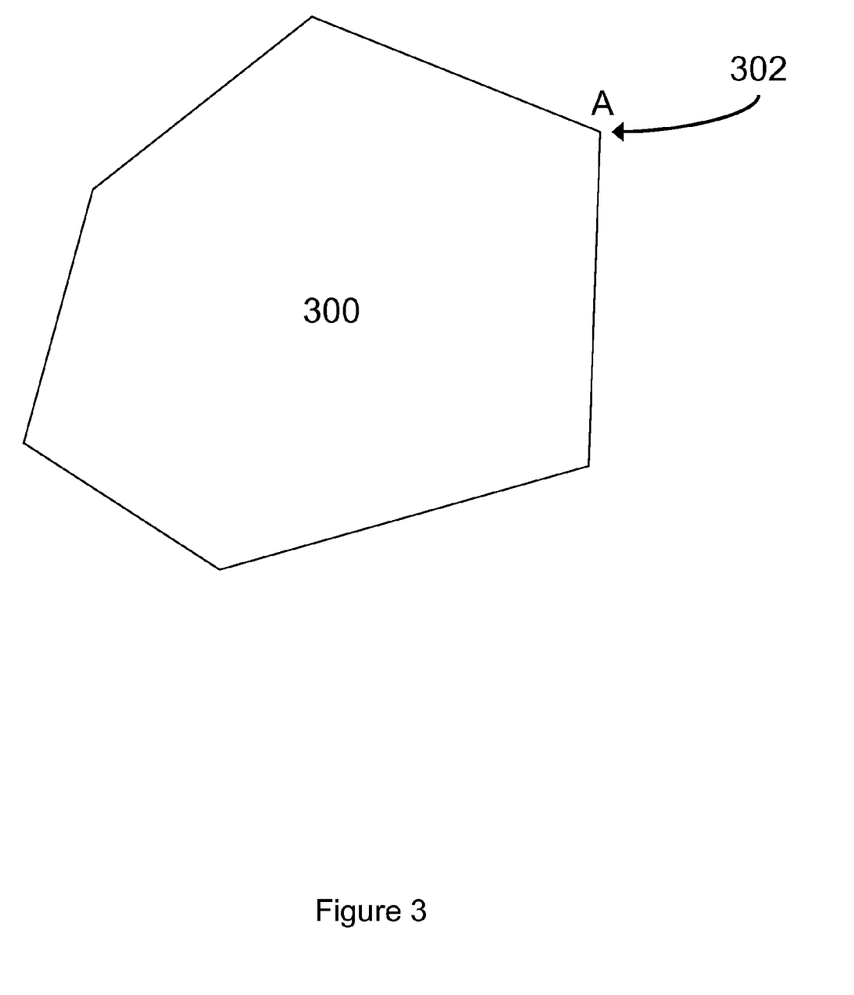
FIG. 3 shows a convex feasible region of a supplier with a point identified in the convex feasible region.
Figure 4:
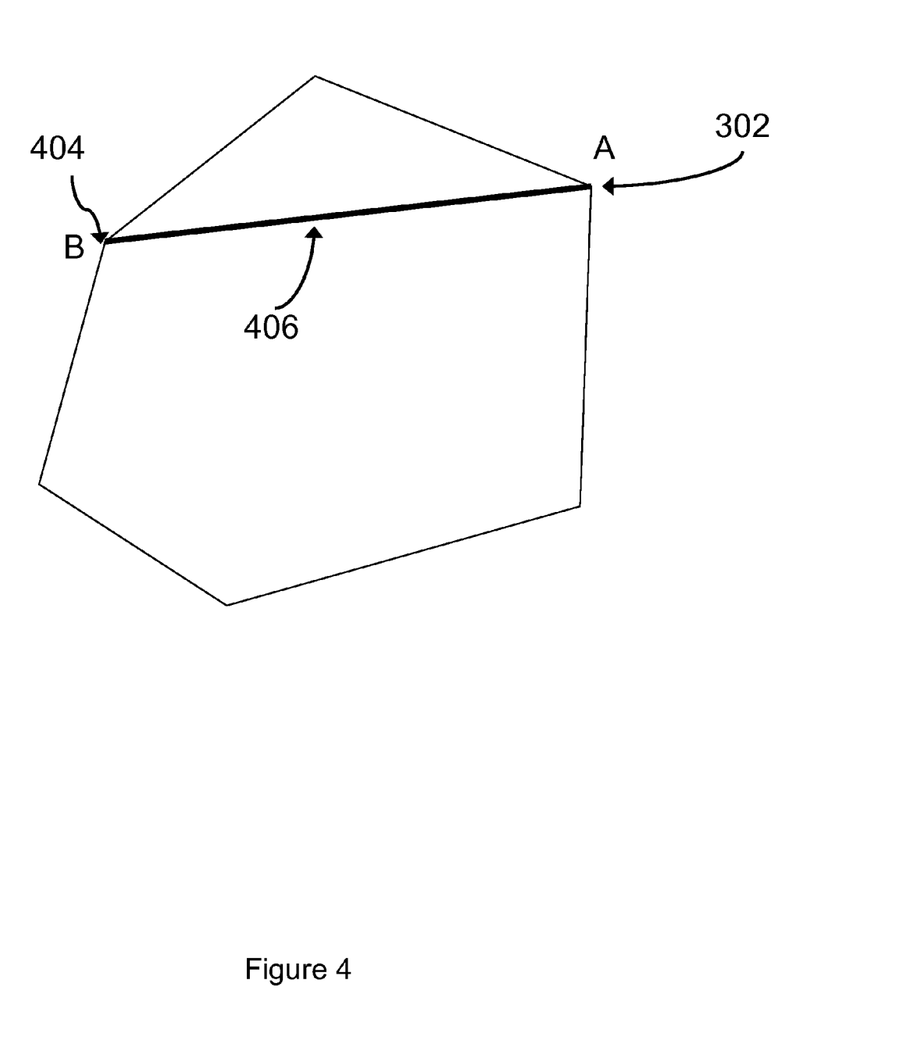
FIG. 4 shows a convex feasible region of a supplier with two feasible points and a line segment connecting the two feasible points in that the convex feasible region.
Figure 5:
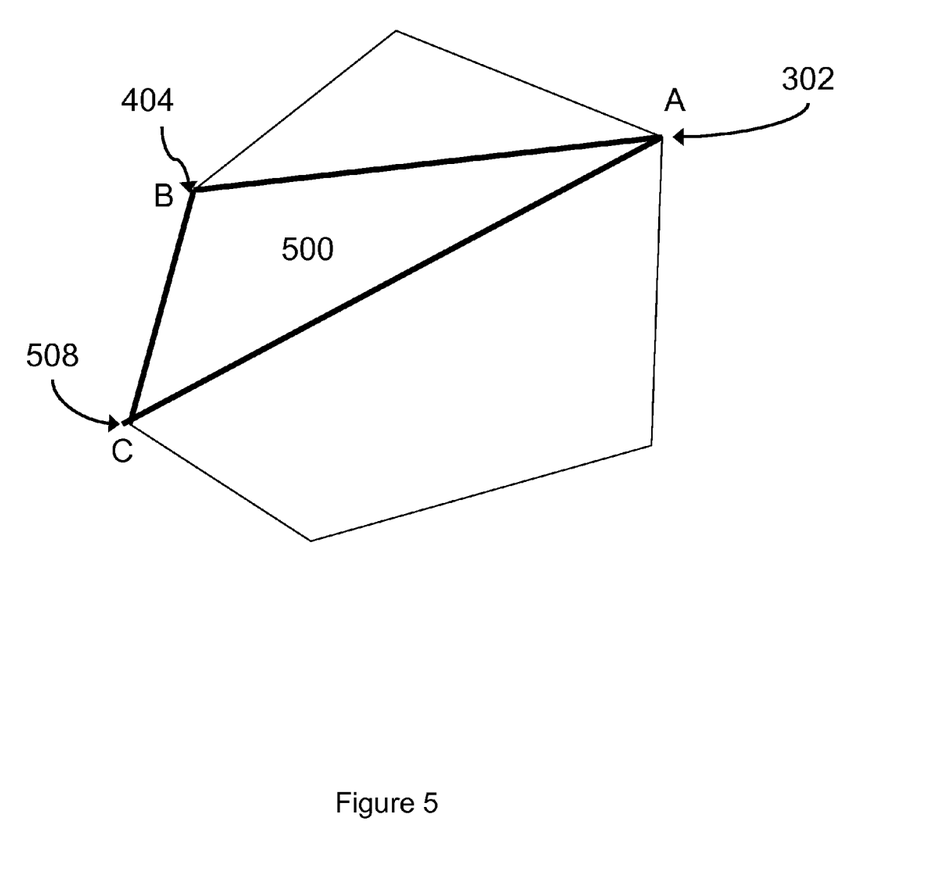
FIG. 5 shows a convex feasible region of a supplier with three feasible points and a triangle connecting the three feasible points in convex feasible region.

This is explained further by referring to FIGS. 3, 4, and 5. In FIG. 3, the enclosed convex region 300 indicates the feasible region of a supplier. The supplier can decide to execute its operations according to any point within enclosed convex region 300. Essentially, the enclosed space indicates the permissible operating possibilities (e.g. feasible values of decision variables). When a purchaser places a set of demands (e.g. request schedule) on the supplier, the supplier may decide (based on its objective function) to operate its business corresponding to the decision variable values implied by point A (302) and will provide a corresponding supply statement (e.g. commit schedule) to the purchaser. The purchaser may then send a second set of demands (request schedule) to the supplier. The supplier may then decide (based on its objective function and the new demand opportunity) to operate its business according to point B (404) of FIG. 4 and will send a corresponding supply statement (commit schedule) to the purchaser. Assuming that the supplier's feasible region has not changed between the calculation of points A and B, both of them remain feasible. Because the region is convex, any point on the line segment 406 connecting points A and B must also be feasible. This is the property this invention exploits. Although the purchaser is unlikely to know the feasible region (300) of the supplier, the purchaser does know points A and B and because of the convexity, knows that any points on the line segment 406 connecting A and B must also be feasible. The purchaser can incorporate this information into its own APS model so that it can create a new set of demands (request schedule) on the supplier which the purchaser knows to be feasible. Referring to FIG. 5 to further illustrate, suppose the purchasers placed three sets of demands (request schedules) onto the supplier which resulted in supply statements (commit schedules) corresponding to points A (302), B (404), and C (508). The purchaser may then infer that—again so long as the feasible region of the supplier did not change—that any point within the ABC triangle 500 of FIG. 5 is feasible. Ideally, a purchaser would have a complete model of the entire supply chain (i.e. a model which reflects both the purchaser and supplier constraints and variables); however, because the purchaser does not have this—either because the supplier is a separate company and keeps its details proprietary or because incorporating both purchaser and supplier models into a single model would be too large to solve in a practical run time—the purchaser interpolates or estimates the supplier's feasible region and incorporates that into the purchaser's model as an approximation or estimation of the supplier's feasible region. By incorporating an approximation of the feasible region of the supplier into the model of its own enterprise, the purchaser is able to make better decisions for its own enterprise knowing that the supplier will be able to support the purchaser's plan.

An embodiment of the invention involves a series of purchaser-supplier ask-answer iterations. During each iteration the purchaser places one or more demands (request schedules) on the supplier and receives a supply response (commit schedule) in return. Each of these commit schedules represents a point in the supplier's convex set of feasible points. After accumulating a sufficient set of commit schedules, the purchaser can use those responses to create an approximation of the supplier's feasible region and add that approximation to the purchaser's model for an additional purchaser's APS run. The results of that run, which interpolates among points in the approximation of the supplier's feasible region, are passed to the supplier, which will confirm that it is able to support that demand.

An aspect is how the purchaser generates queries given that there is a limited amount of time for the process and thus a limited number of queries that can be made. Assuming that the ask-answer system and business process will permit only a limited number of queries, the queries should be generated with the goal of maximizing the useful information obtained about the feasible solution space. Those practiced in the art will recognize there are many potential ways to generate queries. We describe one such method below. For ease of explanation, the below method is described as if all ask-answer queries are done sequentially but those skilled in the art will recognize that many of the ask-answers may be done in parallel.

Figure 6:
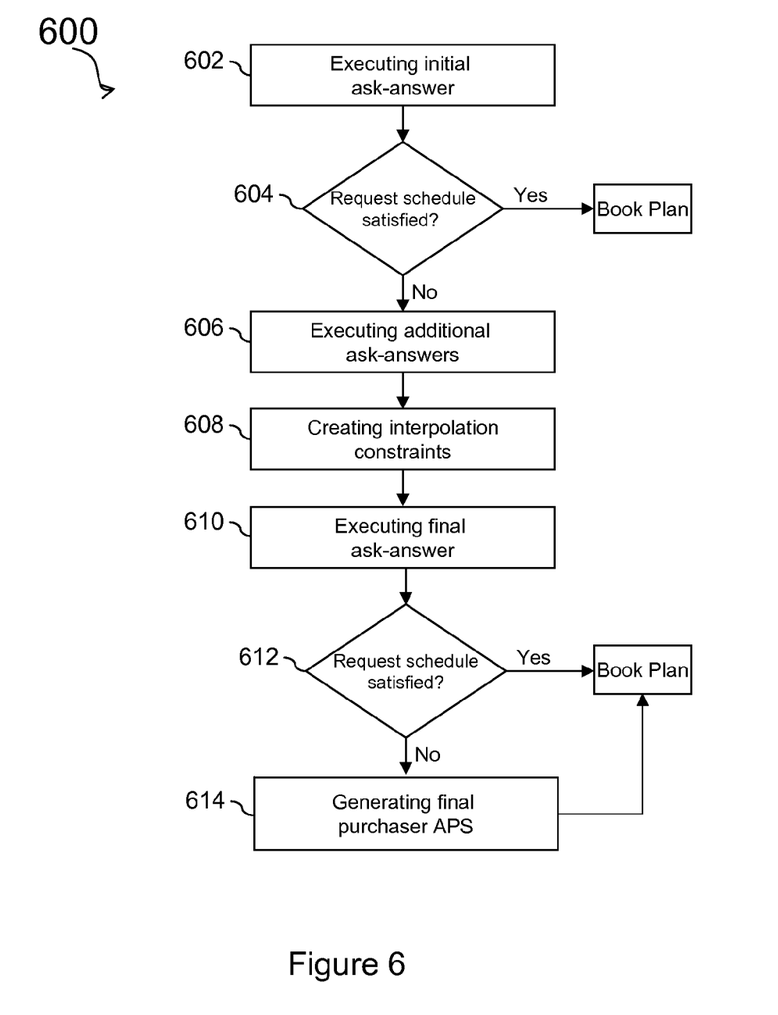
FIG. 6 is a flow diagram illustrating an embodiment of the invention.

Referring to FIG. 6, there is shown a process flow diagram illustrating a method 600 for improved production planning in a supply chain, in accordance with a preferred embodiment of the invention.

In block 602, an initial purchaser-supplier ask-answer process is executed. This is preferably based on a solution of an APS, such as a relaxed LP model, in which at least one, but preferably all, of a second entity's (e.g., supplier's) parts are assumed to be unconstrained. The resulting demands (initial request schedule) for purchased parts are communicated to the second entity (e.g., supplier) that provides a response (commit schedule) back to the purchaser. This response is recorded by the purchaser as a point in the supplier's feasible region. This executing of an ask-answer process is further illustrated and explained with regards to FIG. 7.

Figure 7:
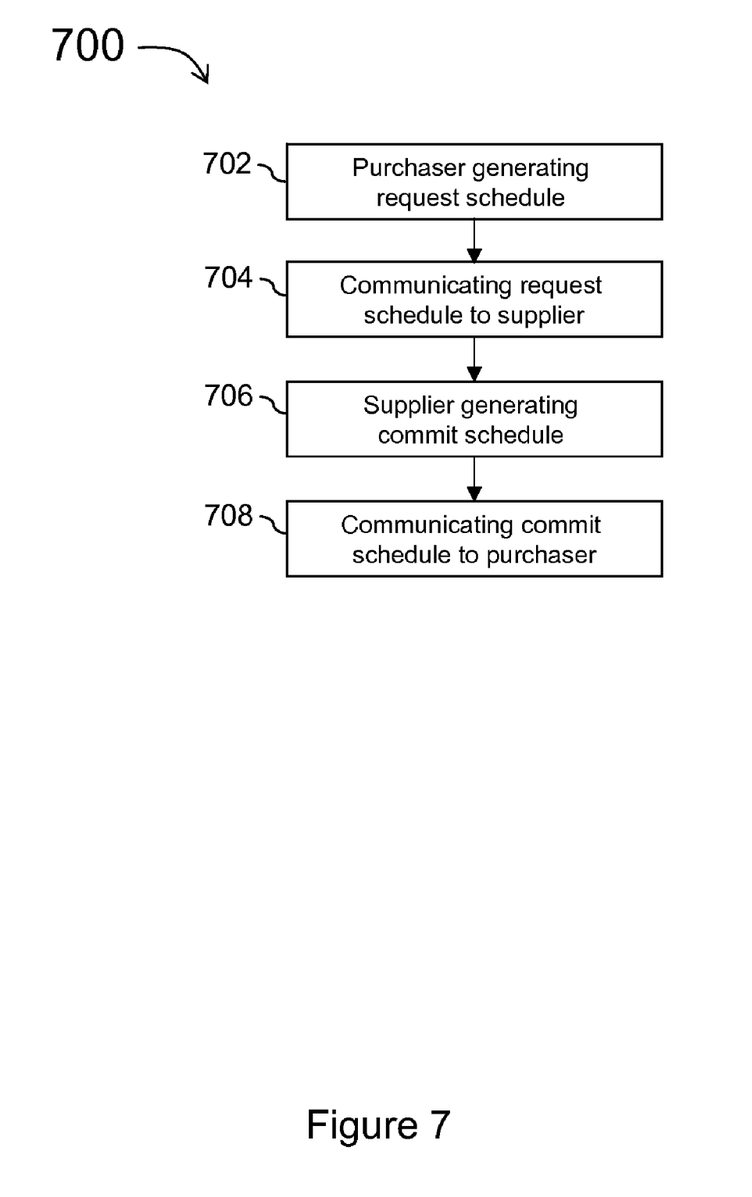
FIG. 7 is a flow diagram illustrating an "ask-answer" process according to an embodiment of the invention.

Referring to FIG. 7, there is shown a process flow diagram illustrating a method 700 for a purchaser-supplier ask-answer process. In block 702, the purchaser (or other downstream entity) solves an LP (or another APS method) and generates a request schedule. If this is not the first iteration, then the LP is "warm started" with the output of a prior downstream LP run to generate the request schedule. Using the output (i.e., the request schedule) of 702, in block 704 the purchaser communicates the request schedule to the supplier (for example including part numbers, quantities, request dates, and the bill-of-material structure associated with the assemblies the requested part numbers will be linked to). In the case of "kitting" requirements the bill-of-material (BOM) structure provides for consideration of such requirements, e.g., for each part number (PN) A two of PN B are required to complete a given assembly. The communication between purchaser and supplier preferably occur using Business-To-Business (B2B) transactions. In the context of the present invention, B2B electronic commerce typically takes the form of automated processes between trading partners. UN/EDI-FACT, ANSI ASC X12, and RossetaNet are examples of standards used in B2B communications.

In block 706, the supplier runs (solves) its APS in response to the information received in 704 and generates a commit schedule. In an embodiment of the invention, the supplier APS model has constraints augmented to enforce relative shipping requirements based on kit information for example. The associated constraints have the form:

$$F_{jmav} - F^0_{jmav} = Q \cdot (F_{jnav} - F^0_{jnav})$$

where $F_{jmav}$ is the decision variable representing the shipment of part m, in period j, from the supplier's plant a, to customer v (i.e. the purchaser), for the new updated solution. The superscript '0' on $F^0_{jmav}$ implies the value of the variable in a prior committed original solution (i.e. based on the official commitment of a prior set of ask-answer cycles). The above constraints are based on two PN, (m,n), though in the general case there may be more than two PNs. The constraints imply that for each PN m, Q of PN n are required, where Q is derived from the bill of material based kit information provided by the purchaser. This kitting constraint is applied to those situations where each part of the kit is consumed by the purchaser only in the kit. In other words, this is not applied for supplied parts used in multiple purchaser assemblies unless the assemblies consume the parts of the kit in equal proportions. If this is not the first iteration, then the supplier's APS model (an LP in a preferred embodiment) is "warm started" with the output of a prior upstream LP run to generate the commit schedule. Using a dual simplex method, a fast update may be made to determine the new optimal solution to the supplier's APS model.

In block 708, the supplier communicates its response (e.g. commit schedule) to the purchaser. The communication between purchaser and supplier preferably occur using B2B transactions as described in block 702.

With reference back to FIG. 6, in block 604 if all the purchaser's demands in the initial request schedule are met by the supplier's responding commit schedule, then the purchaser would inform the supplier to execute and deliver the parts as per the plan, and method 600 ends. However, if any of the purchaser's demands in the initial request schedule are not met by the supplier's responding commit schedule, then the method proceeds to block 606.

In block 606 additional purchaser-supplier ask-answer processes are executed. Whereas in block 602 the initial purchaser APS was generated under the assumption that all purchased parts are unconstrained, in block 606 it is assumed that only some of the purchased parts are unconstrained and that the other purchased parts are constrained to their highest (or, in an alternative embodiment, their lowest) value in any previous supplier response in the present cycle of iterations. By constraining the supply of some purchased parts (and thus limiting the capacity consumed in using such parts), the purchaser's APS run may use more of the unconstrained purchased parts than it would otherwise and thus this approach will tend to result in the purchaser accumulating supplier response points in different regions of the supplier feasible region. This aims toward fulfilling the goal of accumulating points which define a large search space within the supplier's feasible range. That is, the purchaser's approximation of the supplier's feasible region will be closer to its true size (though still likely to be smaller than the full region because of the limitations of computation time).

Below two (of many) example approaches are described, which may be used in generating requests on a supplier during the additional purchaser-supplier ask-answer processes of block 606. Those skilled in the art will recognize that many other approaches for generating requests may be used.

In one example, the purchased parts are sorted alphabetically (or according to any other arbitrary sequence). Assuming there is enough time and computer processing power to execute K (an integer strictly greater than one) alphabetic ask-answers, then each of the "asks" is created by unconstraining every Kth purchased part in the list. For example, if K=2, then half of the purchased parts will be unconstrained by the purchaser's APS in one of the ask-answers and the other half of the purchase parts will be unconstrained in the other ask-answer. The method of purchaser-supplier ask-answer process illustrated in FIG. 7 would be executed K times in this example.

In another example, the average shadow cost of the purchased parts based on running an APS with the supplier commit schedule response as a result of block 602 is considered. The average shadow cost of a purchase part is calculated as the average of its shadow costs across time. The X percentage of purchased parts with the highest shadow costs are unconstrained during each of the shadow cost ask-answers where X will vary from Y (>0) to Z (<100) with increments depending upon how much computational time is available for these ask-answers. For instance, if there is enough processing time to execute three of these ask-answers, then running with values of X equal to 10, 20, and 50 is reasonable.

Observe that the above describes examples of additional ask-answer processes may be executed in parallel if the upstream and downstream enterprises have the parallel processing computing infrastructure available. Further observe that these two examples describe just two approaches (of many) which may be used in generating requests on a supplier. Those skilled in the art will recognize that other approaches for generating requests may be used.

In block 608, the purchaser generates interpolation constraints based on the supply responses found in blocks 602 and 606. For instance, if the vendor shipment response is represented by 'T' variables (as in the above LP model example) then the interpolation constraints are of the form:

$$\lambda_1 T_{jmav}^1 + \lambda_2 T_{jmav}^2 + \ldots + \lambda_N T_{jmav}^N = T_{jmav}$$

where $T^1_{jmav}, T^2_{jmav} \ldots$ represents the previously obtained supplier responses and $\lambda_1 \geq 0, \lambda_2 \geq 0, \ldots$ and $$\sum_i^N \lambda_i = 1.$$

The purchaser's APS model has these additional constraints and decision variables ($\lambda_1, \lambda_2, \ldots$) added and is re-solved using the dual simplex method when block 610 executes the final ask-answer. In a preferred embodiment, this will be the official commit schedule to which both the supplier and purchaser will execute.

In block 610, a final purchaser-supplier ask-answer process is executed. Presuming that the supplier did not make any changes from the beginning in block 602 until block 610 completes and further presuming that the supplier is using an LP or similar APS solver which can find all feasible points within its convex constraint set, then the supplier will have been able to provide a final commit schedule response in block 610 exactly equal to the final request schedule generated in 610.

In block 612 a check to see if the final commit schedule satisfies the final request schedule is executed in block 610, and if so then the purchaser would inform the supplier to execute and deliver the parts as per the plan, and method 600 ends. If the final commit schedule does not satisfy the final request schedule executed in block 610, then one or more of the presumptions is an approximation and the method proceeds to block 614.

In block 614 a final APS is run by the purchaser to create the purchaser's plan based on the latest supplier commit schedule response from block 610, and then the purchaser would inform the supplier to execute and deliver the parts as per the plan based on the final APS solution, and method 600 ends.

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
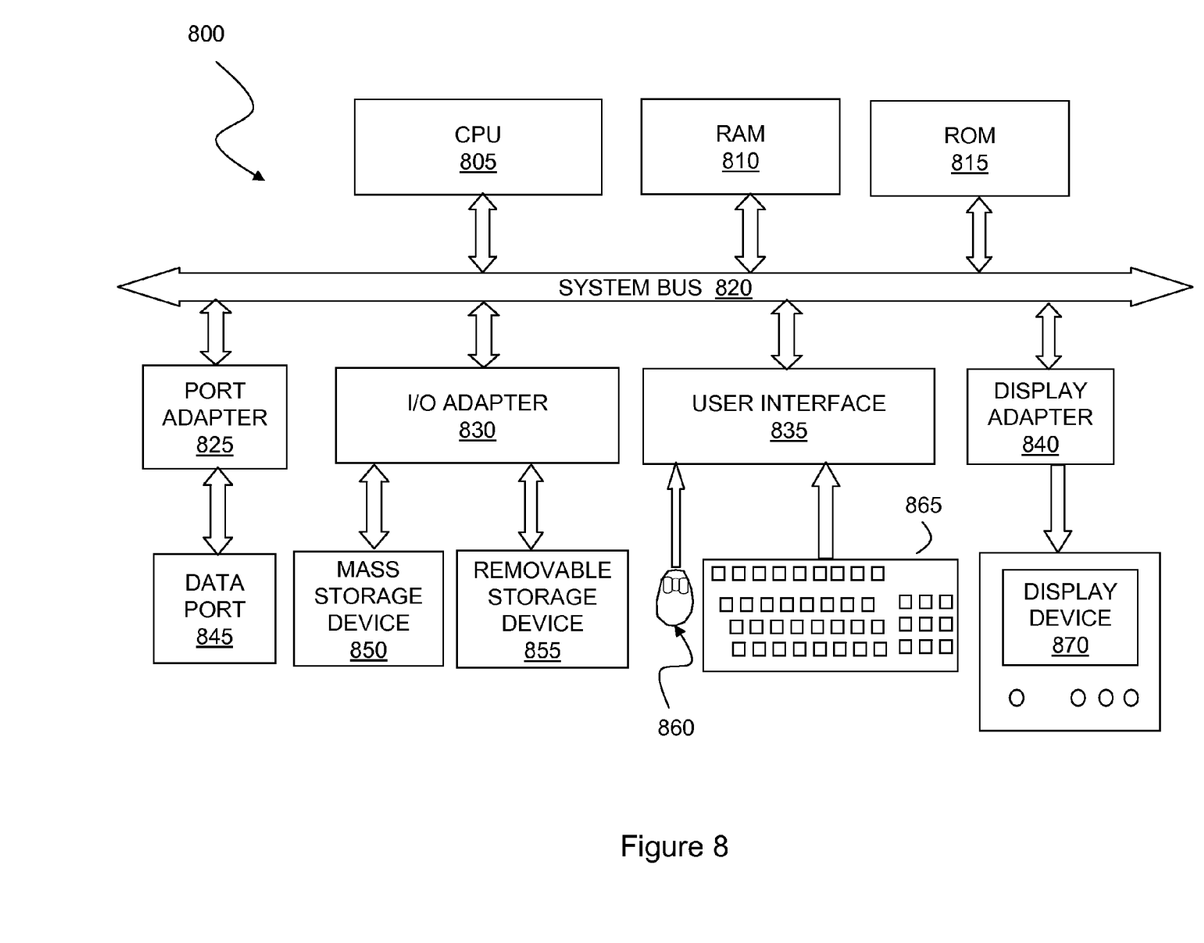
FIG. 8 is schematic block diagram of a general-purpose computing device suitable for practicing embodiments of the invention illustrated in FIGS. 6 and 7.

Generally, the method described herein is practiced with a general-purpose computer and the method may be coded as a set of instructions on removable or hard media for use by the general-purpose computer. FIG. 8 is a schematic block diagram of a general-purpose computer for practicing the present invention. FIG. 8 shows a computer system 800, which has at least one microprocessor or central processing unit CPU 805. CPU 805 is interconnected via a system bus 820 to a random access memory (RAM) 810, a read-only memory (ROM) 815, an input/output (I/O) adapter 830 for connecting a removable and/or program storage device 855 and a mass data and/or program storage device 850, a user interface 835 for connecting a keyboard 865 and a mouse 860, a port adapter 825 for connecting a data port 845 and a display adapter 840 for connecting a display device 870. ROM 815 contains the basic operating system for computer system 800. Examples of removable data and/or program storage device 855 include magnetic media such as floppy drives, tape drives, portable flash drives, zip drives, and optical media such as CD ROM or DVD drives. Examples of mass data and/or program storage device 850 include hard disk drives and non-volatile memory such as flash memory. In addition to keyboard 865 and mouse 860, other user input devices such as trackballs, writing tablets, pressure pads, microphones, light pens and position-sensing screen displays may be connected to user interface 835. Examples of display device 870 include cathode-ray tubes (CRT) and liquid crystal displays (LCD).

A computer program may be created by one of skill in the art and stored in computer system 800 or a data and/or removable program storage device 865 to simplify the practicing of this invention. In operation, information for the computer program created to run the present invention is loaded on the appropriate removable data and/or program storage device 855, fed through data port 845 or entered using keyboard 865. A user controls the program by manipulating functions performed by the computer program and providing other data inputs via any of the above mentioned data input means. Display device 870 provides a means for the user to accurately control the computer program and perform the desired tasks described herein.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 6 and 7.

At least certain of the operations illustrated in FIGS. 6 and 7 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A computer implemented method for determining a production plan comprising the steps of:
   a. generating at least one request schedule by at least one first entity, wherein one of said at least one request schedule is an initial request schedule, and wherein said initial request schedule is based on a solution of said planning system of said at least one first entity, wherein one or more parts of said at least one second entity are assumed to be unconstrained;
   b. generating at least one commit schedule by at least one second entity in response to said at least one request schedule;
   c. generating one or more interpolation constraints using a linear combination of previously generated commit schedules;
   d. solving a planning system of said at least one first entity based on said one or more interpolation constraints; and
   e. repeating steps (a)-(d) until a condition of said planning system is satisfied.

2. The method of claim 1, wherein said condition is satisfied when at least one of said at least one request schedule is satisfied; and further comprising a step of executing a production plan based on said at least one satisfied request schedule.

3. The method of claim 1, wherein said condition is satisfied when at least one of said at least one request schedule is not satisfied; and further comprising a step of solving a final planning system of said at least one first entity before executing a production plan.

4. The method of claim 1, wherein said at least one first entity comprises a purchaser.

5. The method of claim 1, wherein said at least one second entity comprises a supplier.

6. The method of claim 1, wherein at least one of said at least one request schedule is generated using a warm start.

7. The method of claim 1, wherein at least one of said at least one commit schedule is generated using a warm start.

8. The method of claim 1, wherein said one or more interpolation constraints are based on said at least one commit schedule of said at least one second entity.

9. The method of claim 1, wherein said at least one request schedule is generated using a linear programming (LP) model.

10. The method of claim 1, wherein said at least one commit schedule is generated using a linear programming (LP) model.

11. The method of claim 1, wherein said at least one request schedule and said at least one commit schedule are generated using a linear programming (LP) model.

12. The method of claim 1, wherein at least one of said at least one request schedule is based on said at least one commit schedule.

13. The method of claim 1, wherein said at least one commit schedule is based on said at least one request schedule.

14. A program storage device readable by machine, tangibly embodying a program of instructions executable by the machine to perform a method of determining a production plan comprising the steps of:
  a. generating at least one request schedule by at least one first entity, wherein one of said at least one request schedule is an initial request schedule, and wherein said initial request schedule is based on a solution of said planning system of said at least one first entity, wherein one or more parts of said at least one second entity are assumed to be unconstrained;
  b. generating at least one commit schedule by at least one second entity in response to said at least one request schedule;
  c. generating one or more interpolation constraints using a linear combination of previously generated commit schedules;
  d. solving a planning system of said at least one first entity based on said one or more interpolation constraints; and
  e. repeating steps (a)-(d) until a condition of said planning system is satisfied.

15. The program storage device of claim 14, wherein said condition is satisfied when at least one of said at least one request schedule is satisfied; and further comprising a step of executing a production plan based on said at least one satisfied request schedule.

16. The program storage device of claim 14, wherein said condition is satisfied when at least one of said at least one request schedule is not satisfied; and further comprising a step of solving a final planning system of said at least one first entity before executing a production plan.

17. The program storage device of claim 14, wherein said at least one request schedule is generated using a linear programming (LP) model.

18. The program storage device of claim 14, wherein said at least one commit schedule is generated using a linear programming (LP) model.

19. The program storage device of claim 14, wherein at least one of said at least one request schedule is based on said at least one commit schedule.

20. The program storage device of claim 14, wherein said at least one commit schedule is based on said at least one request schedule.

21. A computer system, comprising:
  a processor;
  an address/data bus coupled to said processor; and
  a computer-readable memory unit adapted to be coupled to said processor, said memory unit containing instructions that when executed by said processor implement a method of determining a production plan comprising the steps of:
    a. generating at least one request schedule by at least one first entity, wherein one of said at least one request schedule is an initial request schedule, and wherein said initial request schedule is based on a solution of said planning system of said at least one first entity, wherein one or more parts of said at least one second entity are assumed to be unconstrained;
    b. generating at least one commit schedule by at least one second entity in response to said at least one request schedule;
    c. generating one or more interpolation constraints using a linear combination of previously generated commit schedules;
    d. solving a planning system of said at least one first entity based on said one or more interpolation constraints; and
    e. repeating steps (a)-(d) until a condition of said planning system is satisfied.

22. The computer system of claim 21, wherein said condition is satisfied when at least one of said at least one request schedule is satisfied; and further comprising a step of executing a production plan based on said at least one satisfied request schedule.

23. The computer system of claim 21, wherein said condition is satisfied when at least one of said at least one request schedule is not satisfied; and further comprising a step of solving a final planning system of said at least one first entity before executing a production plan.

24. The computer system of claim 21, wherein said at least one request schedule is generated using a linear programming (LP) model.

25. The computer system of claim 21, wherein said at least one commit schedule is generated using a linear programming (LP) model.

26. The computer system of claim 21, wherein at least one of said at least one request schedule is based on said at least one commit schedule.

27. The computer system of claim 21, wherein said at least one commit schedule is based on said at least one request schedule.

* * * * *